(12) United States Patent
Golovashchenko

(10) Patent No.: US 9,296,037 B2
(45) Date of Patent: Mar. 29, 2016

(54) ELECTRO-HYDRAULIC RIVET AND METHOD OF RIVETING AND WELDING PARTS

(71) Applicant: Ford Global Technologies, LLC, Dearborn, MI (US)

(72) Inventor: Sergey Fedorovich Golovashchenko, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/849,891

(22) Filed: Sep. 10, 2015

(65) Prior Publication Data

US 2015/0375293 A1 Dec. 31, 2015

Related U.S. Application Data

(62) Division of application No. 13/291,346, filed on Jan. 19, 2012, now Pat. No. 9,168,581.

(51) Int. Cl.
*F16B 19/06* (2006.01)
*B21J 15/06* (2006.01)
*F16B 19/08* (2006.01)

(52) U.S. Cl.
CPC .............. *B21J 15/06* (2013.01); *F16B 19/06* (2013.01); *F16B 19/08* (2013.01)

(58) Field of Classification Search
CPC ............ B21J 15/06; B21J 15/20; B21J 15/24; B21D 39/203; B21D 26/06; B21D 26/10; B21D 26/12; B21D 26/033; Y10T 403/477; Y10T 29/49806; Y10T 29/49993; Y10T 29/49956; Y10T 29/5118; F16B 19/06; F16B 19/08

USPC ........... 72/54, 56, 61, 430, 707; 29/509, 512, 29/525.01, 525.05, 525.06, 525.12, 29/525.13, 525.14, 525.15
See application file for complete search history.

(56) References Cited

U.S. PATENT DOCUMENTS

| | | | |
|---|---|---|---|
| 2,293,894 A * | 8/1942 | Fether | B21J 5/04 219/137 R |
| 2,378,118 A * | 6/1945 | Widrich | F16B 19/125 29/421.1 |
| 3,036,374 A * | 5/1962 | Charles | B21D 26/08 138/97 |
| 3,673,833 A | 7/1972 | Cadwell | |
| 5,471,865 A | 12/1995 | Michalewski et al. | |
| 5,521,782 A | 5/1996 | Zieve | |
| 6,094,809 A | 8/2000 | Grassi | |
| 6,301,766 B1 | 10/2001 | Kolle | |
| 7,008,157 B2 * | 3/2006 | O'Banion | F16B 19/125 411/19 |
| 7,530,485 B1 * | 5/2009 | Brasher | B23K 20/085 228/107 |

* cited by examiner

*Primary Examiner* — David Bryant
*Assistant Examiner* — Steven A Maynard
(74) *Attorney, Agent, or Firm* — Damian Porcari; Brooks Kushman P.C.

(57) ABSTRACT

A method of riveting two metal parts through a hole with an electro-hydraulic riveting tool. The electro-hydraulic riveting tool includes a tube that is inserted in the hole and an electrode that is inserted within the tube. A liquid is contained within the tube and the electrode is immersed in the liquid. A stored charge is discharged through the electrode to create a shockwave within the fluid that forms the tube into a rivet structure and creates solid state weld between the rivet flanges and the parts that are joined.

7 Claims, 5 Drawing Sheets

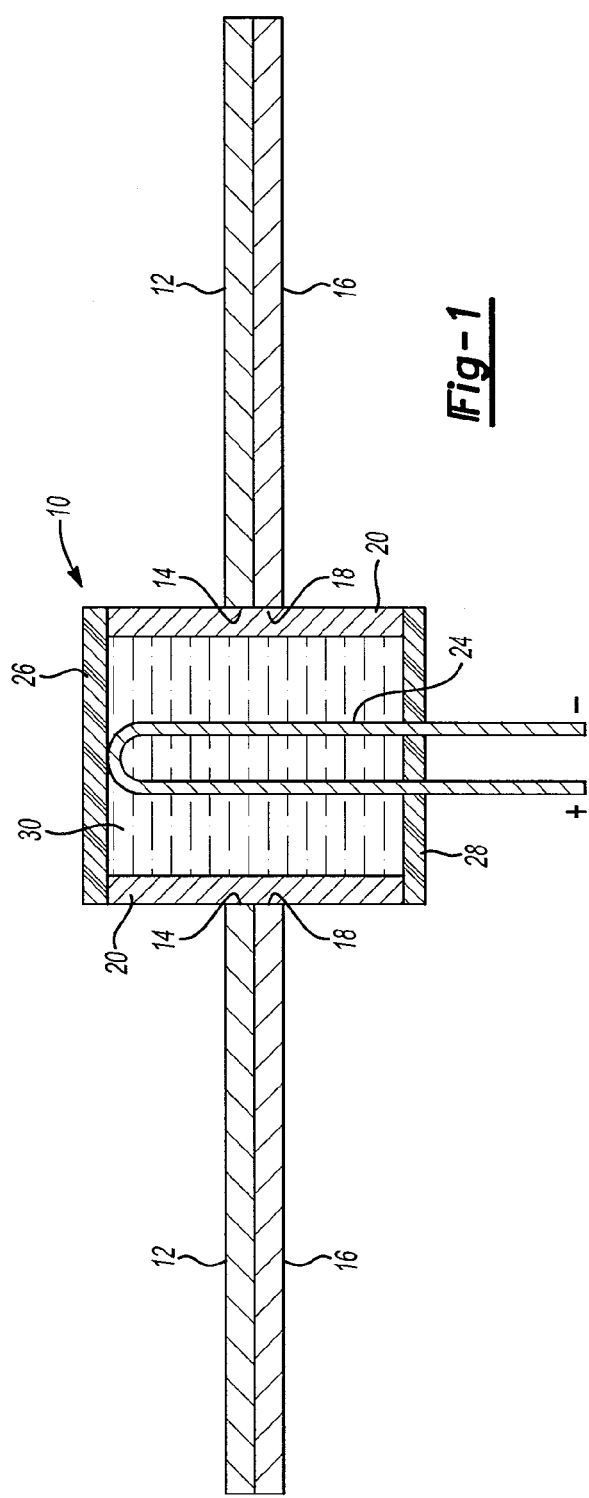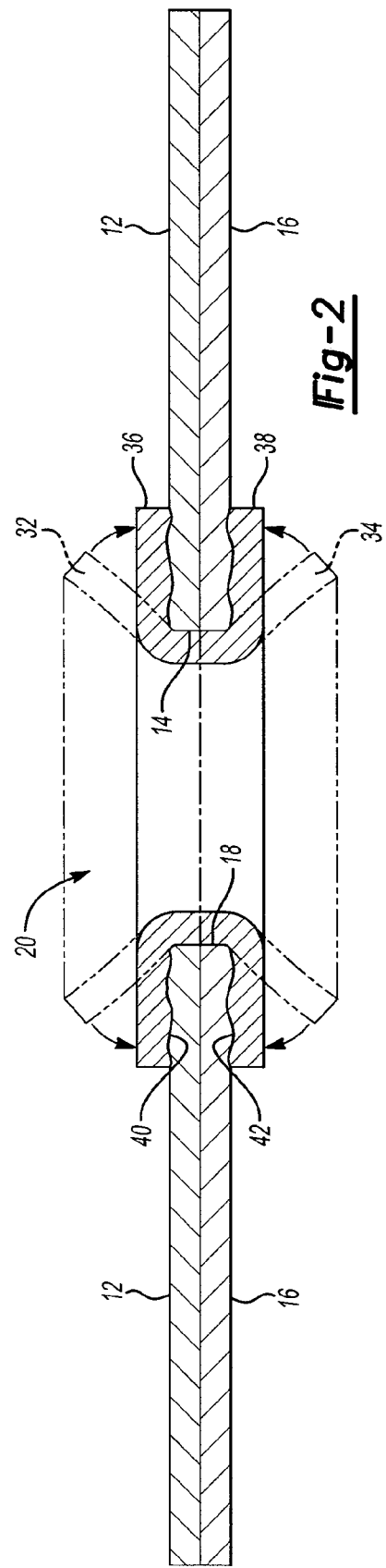

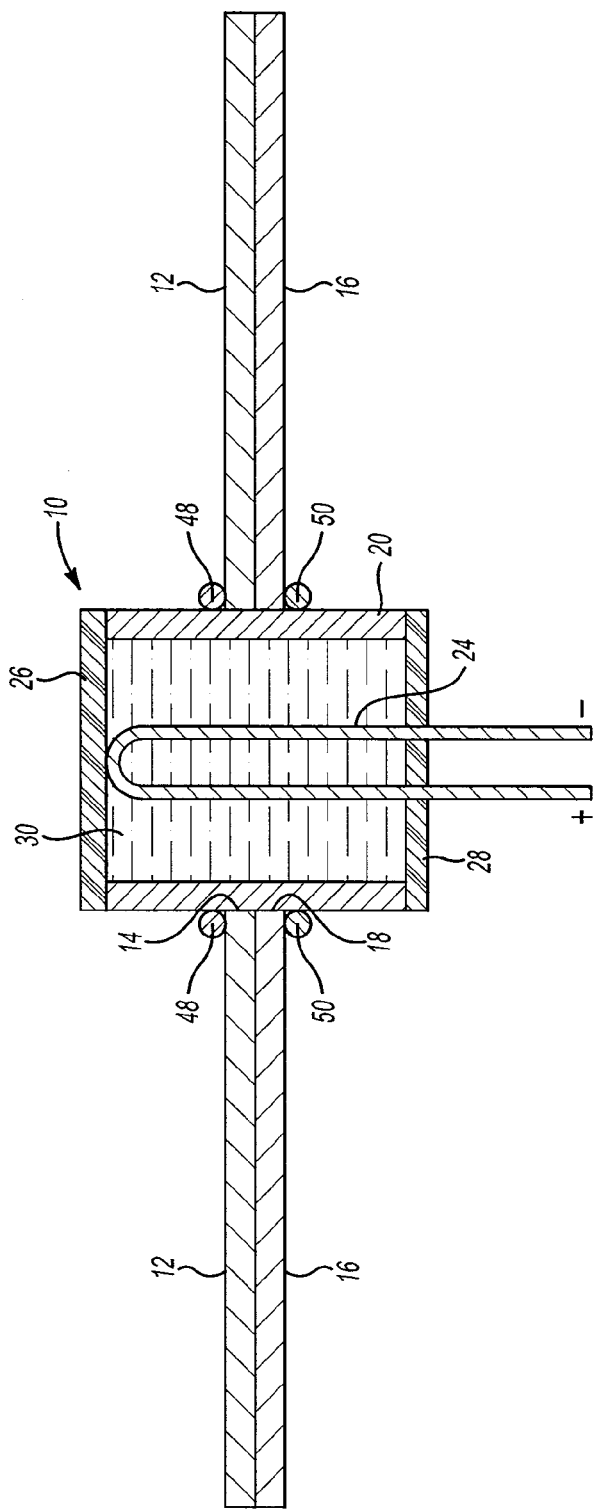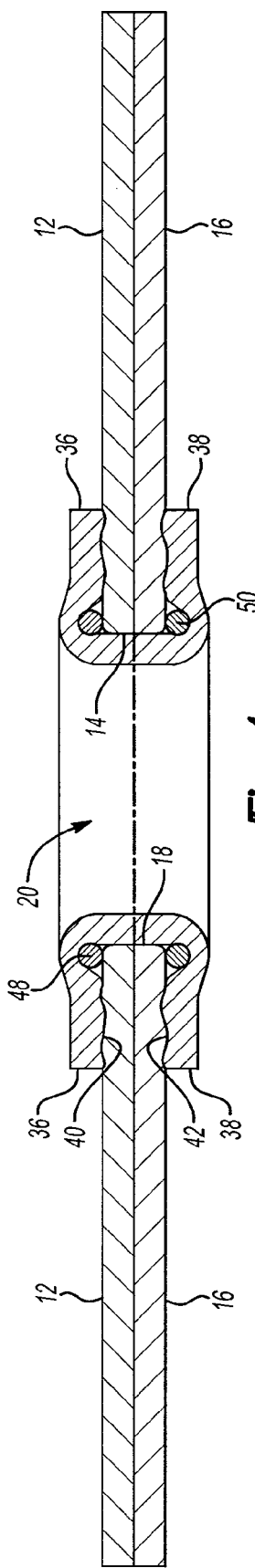

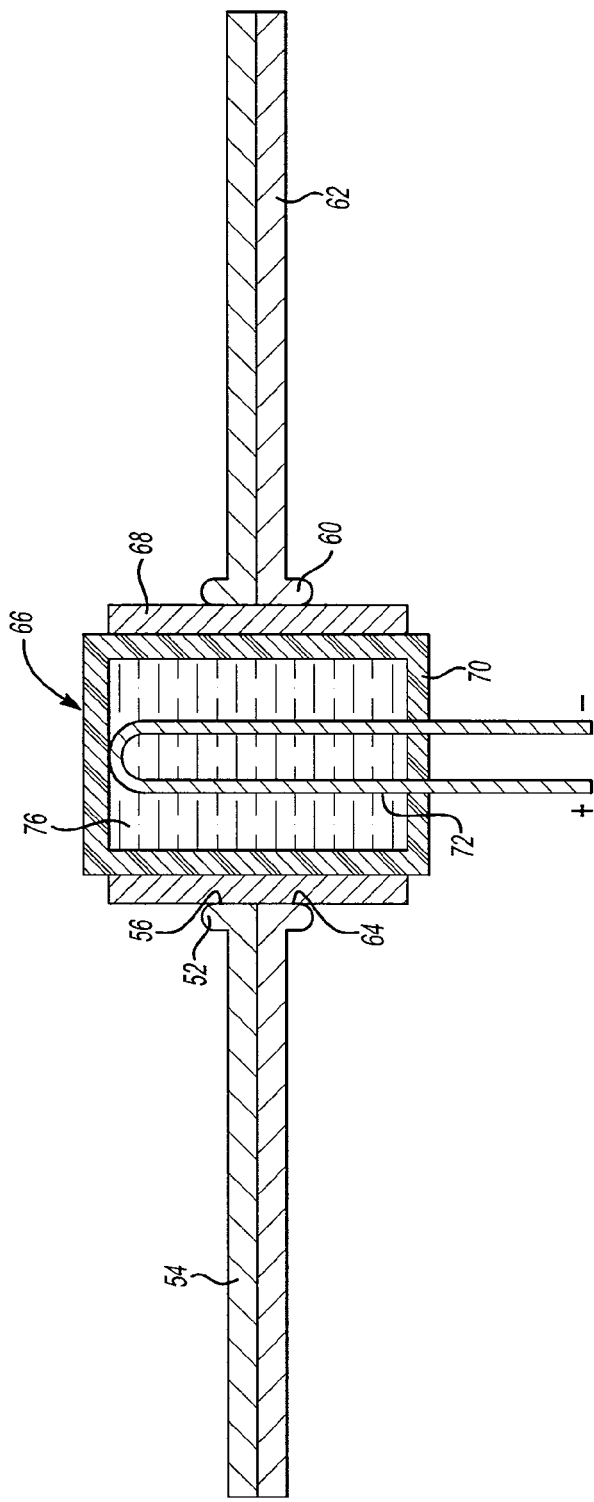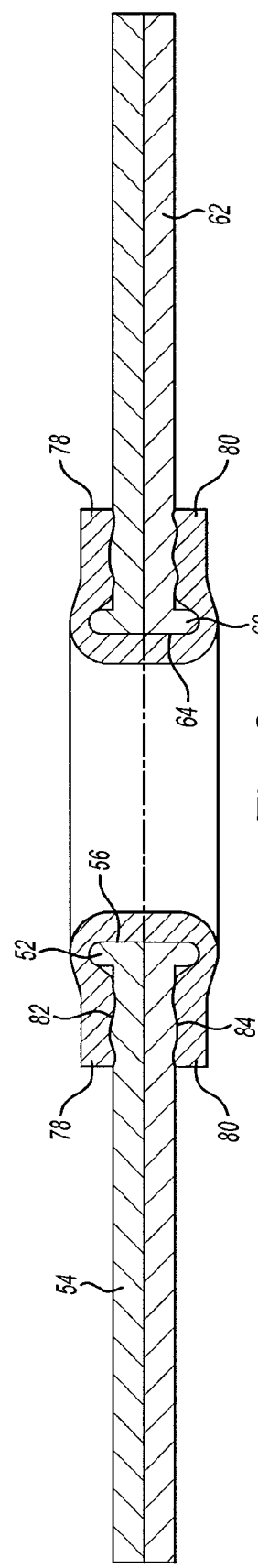

ELECTRO-HYDRAULIC RIVET AND METHOD OF RIVETING AND WELDING PARTS

CROSS-REFERENCE TO RELATED APPLICATIONS

This application is a division of U.S. application Ser. No. 13/291,346 filed Jan. 19, 2012, now U.S. Pat. No. 9,168,581 issued on Oct. 27, 2015, the disclosure of which is hereby incorporated in its entirety by reference herein.

TECHNICAL FIELD

This disclosure relates to a method of joining metal parts with a rivet that welds to the parts in an electro-hydraulic forming process.

BACKGROUND

Manufacturers face problems relating to joining aluminum parts and other types of parts. For example, aluminum alloys are characterized by having less stiffness due to a lower modulus of elasticity. Aluminum is also difficult to spot, or resistance, weld because increased current is required and inconsistent results are obtained.

Aluminum parts are frequently joined by being riveted together. Self-piercing rivets formed of steel may be used, but the dissimilar metals may create a galvanic corrosion problem. Rivets are generally weak and tend to be anisotropic in that they have different strength characteristics in different directions.

In general, welds are stronger than rivets for connecting parts, such as sheet metal parts together. Applicant's co-pending application entitled "Metal Members and Assemblies that have Reinforced Punch Holes and Method of Forming the Holes", U.S. Ser. No. 13/157,357 discloses a method of punching holes and reinforcing holes in sheet metal members, but does not relate to joining panels together. Further, Applicant's co-pending application does not disclose electro-hydraulically forming the circular reinforcement ring about the hole.

The following references were considered before filing this application: U.S. Pat. Nos. 6,301,766; 3,673,833; 6,094,809; 5,521,782; and 5,471,865.

SUMMARY

According to one aspect of the present invention, a method of riveting two metal parts through a hole is disclosed. According to the method, an electro-hydraulic riveting assembly is inserted into a hole in the part. The riveting assembly includes a tube, an electrode, and a liquid contained within the tube. A stored charge is applied to the electrode to create a shockwave within the liquid. The tube is formed by the shock wave to overlap two outer surfaces of the two parts around the hole.

In one embodiment of the method, first and second rings are assembled around the tube and to each of the outer surfaces of the parts before the forming step. Alternatively, the method may comprise forming a hole in each of the metal parts and also forming a rim flange around each of the holes that extends axially from the outer surface of each of the holes.

According to another aspect of the method, the electro-hydraulic riveting assembly may comprise end caps that are secured to first and second ends of the tube to seal the liquid within the tube. The end caps may be plastic caps that are assembled to the tube. The electro-hydraulic riveting assembly may be a cartridge that is preassembled before inserting into the hole in the parts. Alternatively, a plastic bag type of enclosure may be used to contain the liquid in the electrode within the tube.

During the forming step, a pair of circular flanges may be formed from opposite ends of the tube that are expanded radially outwardly to overlap the outer surface of each of the two parts around the hole. The circular radial flanges may form a metallurgical bond to the outer surfaces of the two parts. The metallurgical bond may constitute a solid state weld formed by impact.

According to another aspect of the method disclosed herein, a method of joining at least two metal parts is disclosed. The method may comprise the steps of forming a first hole in a first metal part and a second hole in a second metal part. The first and second parts are assembled together with the first and second holes in alignment. A tube is inserted into the first and second holes and a wire electrode is inserted into the tube. A liquid is contained between the wire electrode and the tube. A stored charge is applied to the wire electrode to create a shockwave within the liquid. A pair of circular flanges is formed from opposite ends of the tube that are expanded radially outwardly by the shockwave to overlap the outer surface of each of the two parts around the hole.

According to another aspect of this disclosure, a rivet is disclosed for securing a pair of metal parts together that define a hole. The rivet comprises a tubular member that extends through the hole from a first side of the two parts to a second side of the two parts. The tubular member has a first circular flange that engages the first side and a second circular flange that engages the second side. A first solid state weld is formed between the first flange and the first side and a second solid state weld is formed between the second flange and the second side.

The above aspects of the method and apparatus will be better understood in view of the attached drawings and the following detailed description of the illustrated embodiments.

BRIEF DESCRIPTION OF THE DRAWINGS

FIG. 1 is a diagrammatic cross-section view of two parts defining a hole in which an electro-hydraulic riveting tool is inserted in the hole;

FIG. 2 is a diagrammatic cross-section view of a tube being electro-hydraulically formed into a rivet that is welded by impact to the outer surfaces of the parts;

FIG. 3 is a diagrammatic cross-section view of an embodiment of the electro-hydraulic forming and impact welding tool inserted in a hole formed by two sheets that also includes a ring around the hole that creates a pulsed welding angle;

FIG. 4 is a diagrammatic cross-section view of the rivet made in accordance with the tool shown in FIG. 3 holding the parts together with flanges impact welded to the outer surfaces of the parts;

FIG. 5 is a diagrammatic cross-section view of another embodiment of the electro-hydraulic riveting tool assembled within a hole defined by the parts that include a rim flange formed around each of the holes and extending axially from the outer surface of the parts;

FIG. 6 is a diagrammatic cross-section view of a rivet formed around the two panels shown in FIG. 5 with the circular flanges impact welded to the outer surface of the panel;

DETAILED DESCRIPTION

Figure 7:
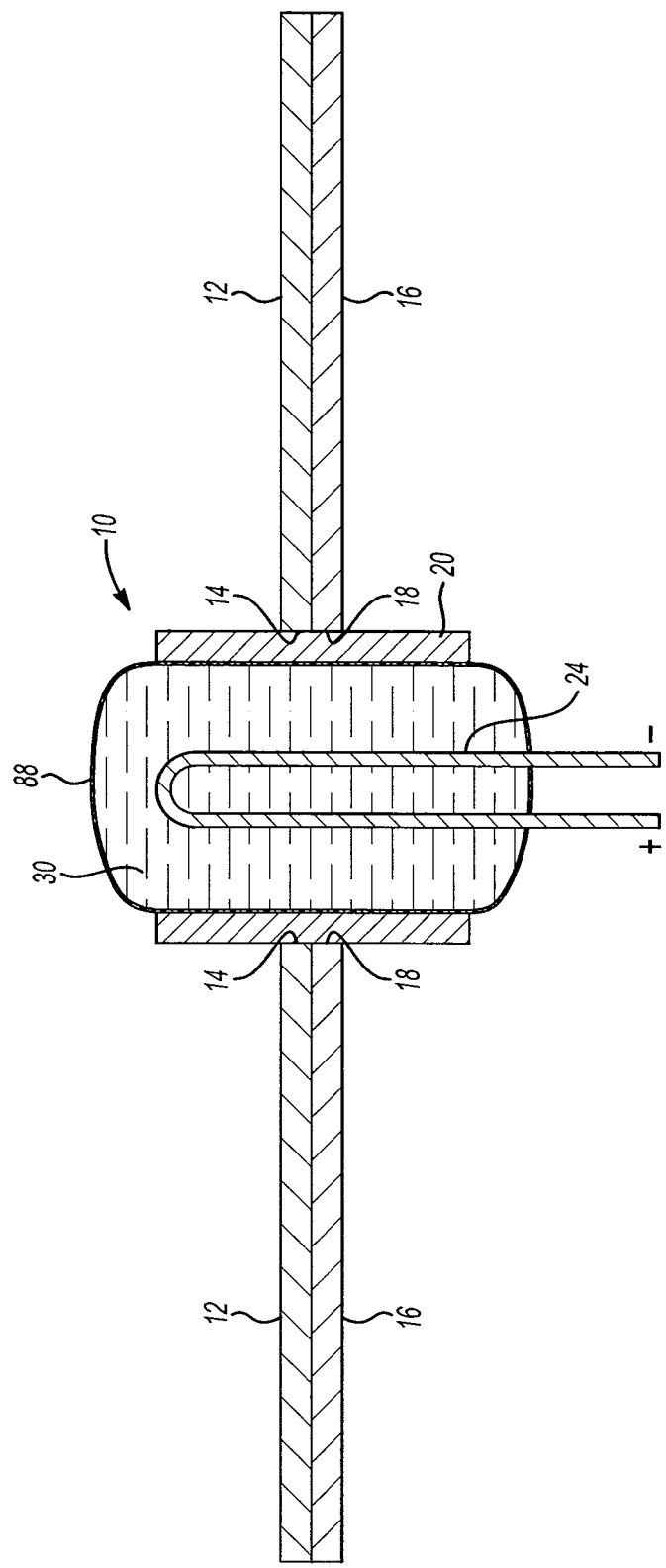
FIG. 7 is an alternative view of an electro-hydraulic forming tool in which the liquid is retained within a bag-like plastic membrane.

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Referring to FIG. 1, an electro-hydraulic riveting assembly, or tool, is generally indicated by reference numeral 10. The assembly 10 is received in a first part 12 that defines a first hole 14 and a second part 16 that defines a second hole 18. The parts may be sheet metal parts or one or both of the parts may be molded, cast, or otherwise formed. Part of the electro-hydraulic riveting assembly 10 is a tube 20 that is preferably an aluminum tube if the first and second parts 12 are formed of aluminum. An electrode 24 is placed inside the tube 20 and a first end cap 26 and second end cap 28 are attached to opposite ends of the tube 20 to contain a liquid 30 in which the electrode 24 is immersed. The electrode 24 is connected to a source of stored charge, such as a bank of capacitors, as indicated by the plus and minus sign. The electrode 24 is a wire electrode that may be formed of aluminum wire. When the electrode 24 receives the stored charge, the electrode vaporizes creating a shockwave within the liquid 30 that deforms the tube 20 to join the two parts 12, 16 together in a local area.

Referring to FIG. 2, the tube 20 is shown being formed in response to the discharge of the wire electrode 24. The tube generally indicated by reference numeral 20 includes a first flange 32 that is partially formed toward the outer side of the first part 12. A second flange 34 is shown partially formed toward the outer surface of the second part 16. The tube 20 remains within the first and second holes 14, 18 during the forming process and thereafter. The first and second partially formed flanges 32, 34 form a first rivet flange 36 and a second rivet flange 38 when they fully engage the first part 12 and second part 16, respectively. A first solid state weld 40 is formed between the first rivet flange 36 and the first part 12 and a second solid state weld 42 is formed between the second rivet flange 38 and second part 16. The solid state welds 40, 42 form a regular wave structure at a pulsed welding interface that will be described subsequently with reference to FIG. 8. A solid state weld is formed without melting the rivet or the sheets. Consequently, there is no loss of tensile or shear strength caused by the formation of the weld. The weld forms a strong joint that is superior in strength to conventional rivet joints.

Referring to FIG. 3, an alternative embodiment is shown in which a first ring 48 is assembled to one side of the first part 12 and about the tube 20. A second ring 50 is assembled to the outer side of the second part 16 and is also disposed about the tube 20. The first and second rings 48, 50 are provided to increase the extent of the pulse wall. The rings 48, 50 cause the first and second rivet flanges 36, 38 to increase the impact angle of the tube 20 as it is formed into the rivet flanges 36, 38. The impact angle is preferably approximately 7° relative to the outer surfaces of the first and second parts 12 and 16. The same reference numerals are used in FIGS. 3 and 4 as were used in FIGS. 1 and 2. The electro-hydraulic riveting tool 10 is shown in FIG. 3 inserted within the first and second holes 14, 18 that are formed in the first and second parts 12 and 16, respectively. The electrode 24 is immersed in a liquid 30 that is retained within the tube 20 by the end caps 26 and 28.

Referring to FIG. 4, the first and second rivet flanges 36 are shown fully formed about the rings 48 and 50. First and second solid state welds 40 and 42 are formed where the first and second rivet flanges 36 and 38 impact against the outer surfaces of the first and second parts 12 and 16, respectively. The tube 20 extends through the holes 14 and 18 and secures the first part 12 and second part 16 together.

Referring to FIG. 5, an alternative embodiment is shown wherein a first rim flange 52 is formed on a first part 54 that defines a first hole 56. A second rim flange 60 is provided on a second part 62 that defines a second hole 64. An electro-hydraulic riveting cartridge 66 is shown disposed within the first and second holes 56 and 64. The riveting cartridge 66 includes a rivet tube 68 that is disposed about a molded case 70. The molded case 70 is preferably a molded plastic enclosure that is received within an aluminum rivet tube 68. An electrode 72 is disposed within the molded case 70 and is immersed in a liquid 76. The riveting cartridge 66 is discharged when it is connected to a source of stored electrical charge that sends a shockwave through the liquid 76, as previously described with reference to FIGS. 1-4.

Referring to FIG. 6, the first and second parts 54 and 62 are shown joined together by the rivet tube 68 after forming. A first rivet flange 78 and a second rivet flange 80 are shown formed against the outer surface of the first part 54 and second part 62. The impact of the flanges is enhanced by providing the rim flanges 52 and 60 that create angles of approximately seven degrees during the impact of the rivet flanges into the part surfaces 54 and 62. The rim flanges enhance the formation of a first solid state weld 82 and a second solid state weld 84 between the first and second rivet flanges 78 and 80 and the first and second parts 54 and 62.

Referring to FIG. 7, an another alternative embodiment is shown in which a plastic bag 88 is substituted for the electro-hydraulic riveting assembly described with reference to FIG. 1. The same reference numerals are used with reference to FIG. 7 as were used with reference to FIG. 1 because all of the other parts are essentially unchanged. The plastic bag 88 is received within the tube 20. The tube 20 is inserted in the first and second holes 14 and 18 that are formed in the first and second parts 12 and 16. An electrode 24 is disposed within the plastic bag 88 and the plastic bag is filled with a fluid 30. The electrode is discharged by connecting to a source of stored charge, as was previously described with reference to FIG. 1. When the electrode 24 is discharged, the tube is formed, as previously described with reference to FIGS. 1 and 2. The several different embodiments of the EHF tool and the several different hole structures including a plain hole, a ring attachment or a rim flange may be interchanged in any combination.

Figure 8:
FIG. 8 is a photomicrograph showing the impact weld microstructure at the pulse welding interface.

Referring to FIG. 8, a photomicrograph is shown of a first part 90 that is welded in the solid state weld to a rivet flange. A pulsed weld interface 94 is shown to comprise a regular wave structure at the pulsed welding interface. There is no melting of the material of the first part 90 or rivet flange 92. Since there is no melting of the materials, there is no loss of tensile or shear strength. This results in a localized joining of the rivet to the part surface, as previously described with reference to FIGS. 1-7. The pulsed welding interface creates a strong joint that is superior to the strength of a conventional riveted joint.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A rivet adapted to secure two parts together that define a hole comprising:
    a tubular member that extends through the hole from a first side of the two parts to a second side of the two parts, the tubular member including an electrode and a liquid contained within the tubular member, and a stored charge connected to the electrode that is adapted to create a shockwave within the liquid in order to deform the tubular member into a predetermined shape such that a first flange engages the first side and a second flange engages the second side; and
    wherein upon discharge of the stored charge, the electrode forms a shockwave, which creates a first solid state weld between the first flange and the first side and a second solid state weld between the second flange and the second side.

2. The rivet of claim 1 further comprising a first ring and a second ring adapted to be disposed around the tubular member with each ring being disposed adjacent one of the first and second sides of the two parts.

3. The rivet of claim 1 wherein the first part includes a first rim flange formed around the hole on the first side and the second part includes a second rim flange formed around the hole on the second side of the two parts that extends axially outwardly from an outer surface of each of the two parts.

4. A rivet comprising:
    a tubular rivet adapted to attach a first part defining a first hole to a second part defining a second hole, the tubular rivet including an electrode and a liquid, both contained within the tubular rivet; and
    wherein the electrode is adapted to be connected to a stored charge whereupon being discharged through the electrode creates a shockwave in the liquid that deforms the tubular rivet to form a first flange adjacent the first part and a second flange adjacent the second part, and further forms a first solid state weld connecting the first flange to the first part and forms a second solid state weld connecting the second flange to the second part.

5. The rivet of claim 4 further comprising a first ring adapted to contact a first outer surface of the first part and extending around the tubular member and a second ring adapted to contact a second outer surface of the second part and extending around the tubular member.

6. The rivet of claim 4 wherein the first part includes a first rim flange formed around the first hole and the second part includes a second rim flange formed around the second hole, wherein the first and second rim flanges extend axially outwardly from an outer surface of each of the first and second parts.

7. A rivet assembly for securing two parts together defining a hole comprising:
    a tube partially defining a container inserted in the hole;
    a liquid contained within the container; and
    an electrode disposed in the liquid and connectable to a stored charge that is dischargeable to create a shockwave within the liquid and adapted to deform the tube creating first and second flanges in contact with the first and second parts and solid state welds therebetween.

* * * * *